Patented Jan. 21, 1941

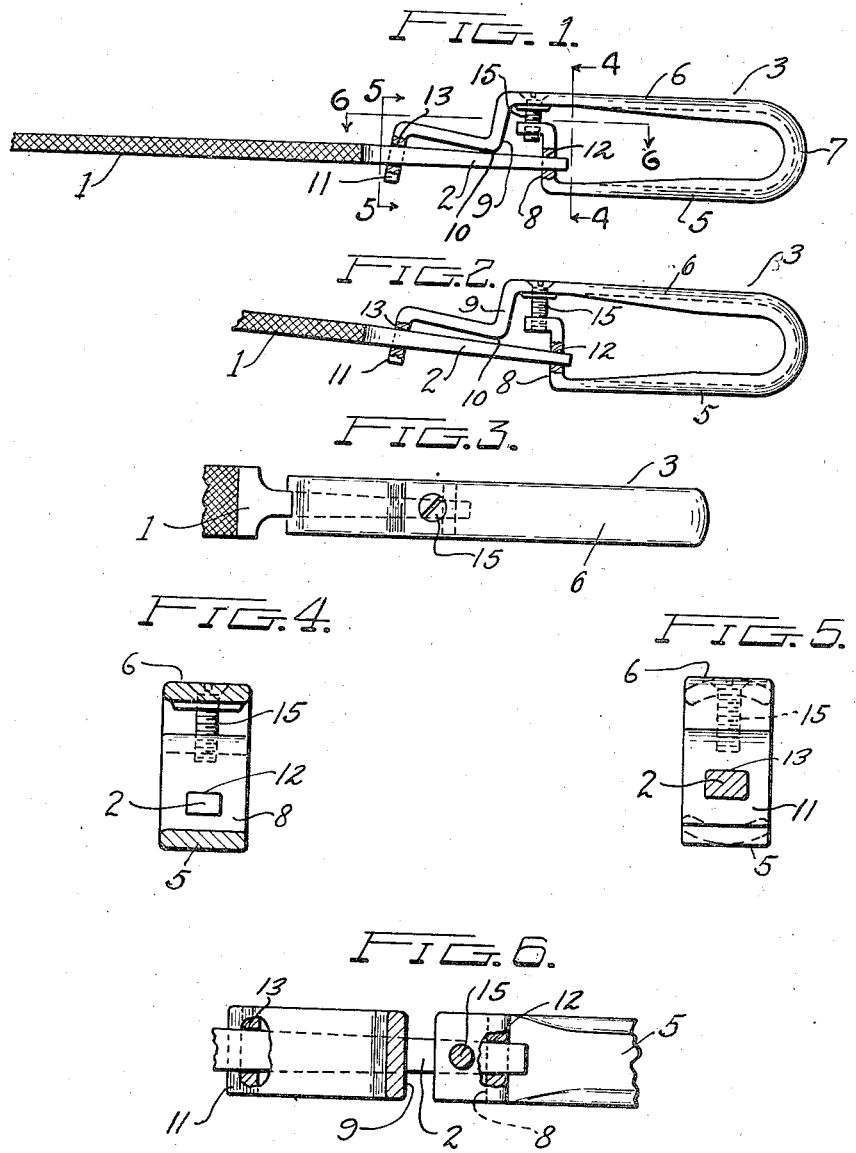

2,229,453

UNITED STATES PATENT OFFICE 2,229,453

TOOL HANDLE

William E. Heuer, Toledo, Ohio

Application March 7, 1939, Serial No. 260,321

7 Claims. (Cl. 29—80)

This invention relates to handles adapted for use on tools, such for instance as files, having handle engaging tangs or spikes at an end thereof and usually of tapered form.

The object of the invention is the provision of a simple and inexpensive handle of this character formed in a single piece preferably from metal bar stock, adapted to receive tool tangs of different sizes and adjustable to releasably grip such tangs in a firm and efficient manner.

The invention is fully described in the following specification, and one embodiment thereof illustrated in the accompanying drawing, in which—

Figure 1 is a side view of a handle embodying the invention, with a file, fragmentarily shown, engaged therewith; Fig. 2 is a similar view, with the file tang loosely slipped into engagement with the handle and with the adjusting screw in loosened position; Fig. 3 is a top plan view of Fig. 1; Figs. 4 and 5 are enlarged cross-sections on the lines 4—4 and 5—5, respectively, in Fig. 1, and Fig. 6 is an enlarged longitudinal section on the line 6—6 in Fig. 1.

Referring to the drawing, 1 designates a tool, in the present instance a file, having the customary tapered handle gripping tang 2 at one end.

The handle 3 in which the invention resides is preferably, but not necessarily, made of cold rolled steel bar stock with its edges rounded and opposing sides flat, or otherwise, as desired.

In forming the handle, a suitable length of such stock is bent substantially in U-shape to form spaced opposing leg portions 5 and 6 connected by a loop 7 and shown, in the present instance, as parallel, or substantially so, although in some cases it may be desirable to shape them differently to conform to or form a better grip for the hand. The leg portion 5 terminates at its free end in an L-shaped finger 8 which extends inwardly at right angles thereto and then lengthwise thereof.

The leg portion 6 at a short distance beyond the finger 8 is angled inwardly at 9 to form a shoulder 10, and is then extended forwardly, preferably on a slight outward incline, relative to a longitudinal plane of the handle, and terminates at its free end in an inturned finger 11. The fingers 8 and 11 are perforated at 12 and 13, respectively, in substantially the same longitudinal plane of the handle to receive the tang 2 of a tool, such perforations being of different sizes to conform to the usual taper of such tangs.

The leg portions 5 and 6 of the handle are normally sprung slightly outward from a position which the apertures 12 and 13 are in true longitudinal register, and are drawn toward each other by the tightening of a screw 15 which passes loosely through the leg 6 and threads into the rearwardly turned portion of the L finger 8. When a tool tang has been inserted in the handle apertures and said screw tightened, the said apertures are drawn into longitudinal alignment and the shoulder 9 is forced against the tang intermediate the apertures to cooperate therewith to form a three-point grip for the tang and to hold it firmly in the handle.

It is apparent that the apertures 12 and 13 are not restricted to receive a single sized tang, but that tangs of different sizes may be inserted therein, thus adapting the handle for use on files or tools of different sizes; and also that the inturned portion 9 serves as a finger grip to facilitate holding the handle when in use.

In the use of my handle, it is not necessary to loosen and then tighten the screw 15 each time a tool tang is engaged with or released from the engaging parts of the handle. When the parts have been set in tool-holding position by a tightening of the screw to a limited extent, but not so as to effect a firm and rigid binding of the engaged parts, a tang may be removed from engagement with the handle by striking the inner end of the tang or by exerting sufficient pressure thereon to overcome the frictional resistance against withdrawal afforded by the engagement of the handle parts 8 and 10 with the tang. When the engaging parts of the handle have been so adjusted, a tool tang may also be quite firmly engaged therewith by forcing it into the receiving apertures so that the taper of the tang effects a wedging engagement therewith. It is apparent, however, that if desired the adjusting screw may be tightened to such an extent as to prevent the removal of a tool tang from the handle without first loosening the screw.

I wish it understood that my invention is not limited to any specific construction, arrangement or form of the parts, as it is capable of numerous modifications and changes without departing from the spirit of the claims.

Having thus described my invention, what I claim as new, and desire to secure by United States Letters Patent, is:

1. A handle of the class described having laterally spaced longitudinally extending relatively adjustable portions with longitudinally spaced apertured tool tang receiving parts, one on each portion, one of said portions having a lateral thrust shoulder intermediate said parts and operable to cooperate therewith to firmly grip an engaged tool tang when said portions have predetermined relative lateral movements, and means connecting said portions and operable to move said portions laterally into gripping engagement with a tool tang.

2. A handle of the class described having laterally spaced longitudinally extending portions, each having an inwardly angled part with one part spaced from the other longitudinally of the handle and both having substantially aligned tool tang receiving apertures, one of said portions having a lateral thrust shoulder intermediate said apertured parts and operable to cooperate therewith to form a three-point grip for a tool tang inserted in said apertures when predetermined relative lateral movement is imparted to said portions, and means connecting said portions and operable to move said portion laterally into gripping engagement with a tool tang.

3. A handle of the class described having two laterally spaced longitudinally extending portions connected together at one end and each having an inwardly angled part at its other end with one part spaced from the other lengthwise of the handle and both having substantially aligned tool tang receiving apertures and one part having a lateral thrust shoulder intermediate said parts, and means adjustably connecting said portions near said parts and operable to move said parts in opposite directions crosswise of the handle to cause them to cooperate with said shoulder to firmly grip a tool tang inserted into said parts.

4. A handle of the class described comprising a U-shaped member having its legs of different lengths and each provided at its free end with an inturned part spaced lengthwise of the handle relative to the other part and each part having an aperture to receive a tool tang lengthwise of the handle, one of said legs having a tang engaging shoulder intermediate said parts, and means connecting and operable to move said legs in opposed directions to cause said apertured parts and shoulder to effect a three-point grip on a tang.

5. A handle of the class described comprising a U-shaped metal bar having its legs normally sprung apart a predetermined distance, said legs each having a laterally extending apertured part in spaced relation to the other lengthwise of the handle and adapted to receive a tool tang, one of said legs having a shoulder intermediate said parts for side engagement with a tang inserted therein, and means connecting and operable to move said legs in opposing directions to cause said apertured parts and shoulder to effect a three-point grip on a tang.

6. A handle of the class described having laterally spaced longitudinally extending relatively adjustable portions with longitudinally spaced tool tang engaging parts, two of such parts on one portion and one on the other portion, the latter forming a lateral thrust shoulder intermediate the parts on the other portion and operable to cooperate therewith to firmly grip an engaged tool tang when said portions have predetermined relative lateral movements, and means connecting said portions and operable to move said portions laterally into gripping engagement with a tool tang.

7. A handle of the class described of U-form having one leg terminating in an inwardly extending finger and its other leg extended beyond said finger and provided short of its end and in advance of said finger with an inturned portion forming a shoulder and thence extending outwardly lengthwise of the handle and terminating in an inwardly directed finger, said fingers having tool tang receiving apertures in substantial register lengthwise of the handle, and a screw connecting the long leg and the finger of the short leg and operable to draw the legs toward each other to cause the walls of said apertures and said shoulder to cooperate to effect a three-point grip on a tool tang inserted in said apertures.

WILLIAM E. HEUER.